Aug. 4, 1953     K. B. DONNELL     2,647,339
METHOD OF AND APPARATUS FOR MANIPULATING FISH LINES
Filed March 25, 1949     2 Sheets-Sheet 1
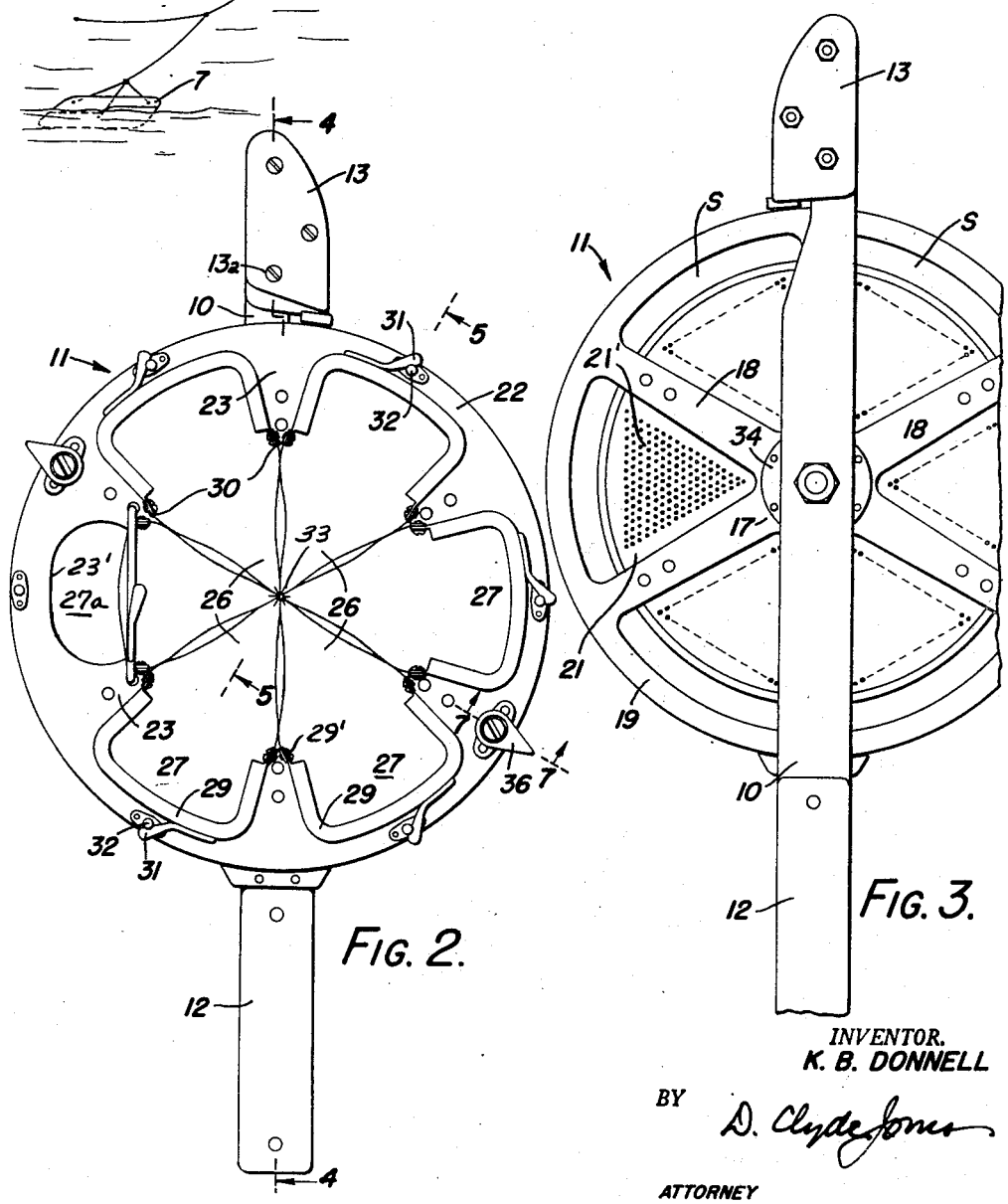
INVENTOR.
K. B. DONNELL
BY D. Clyde Jones
ATTORNEY Aug. 4, 1953  K. B. DONNELL  2,647,339
METHOD OF AND APPARATUS FOR MANIPULATING FISH LINES
Filed March 25, 1949  2 Sheets-Sheet 2
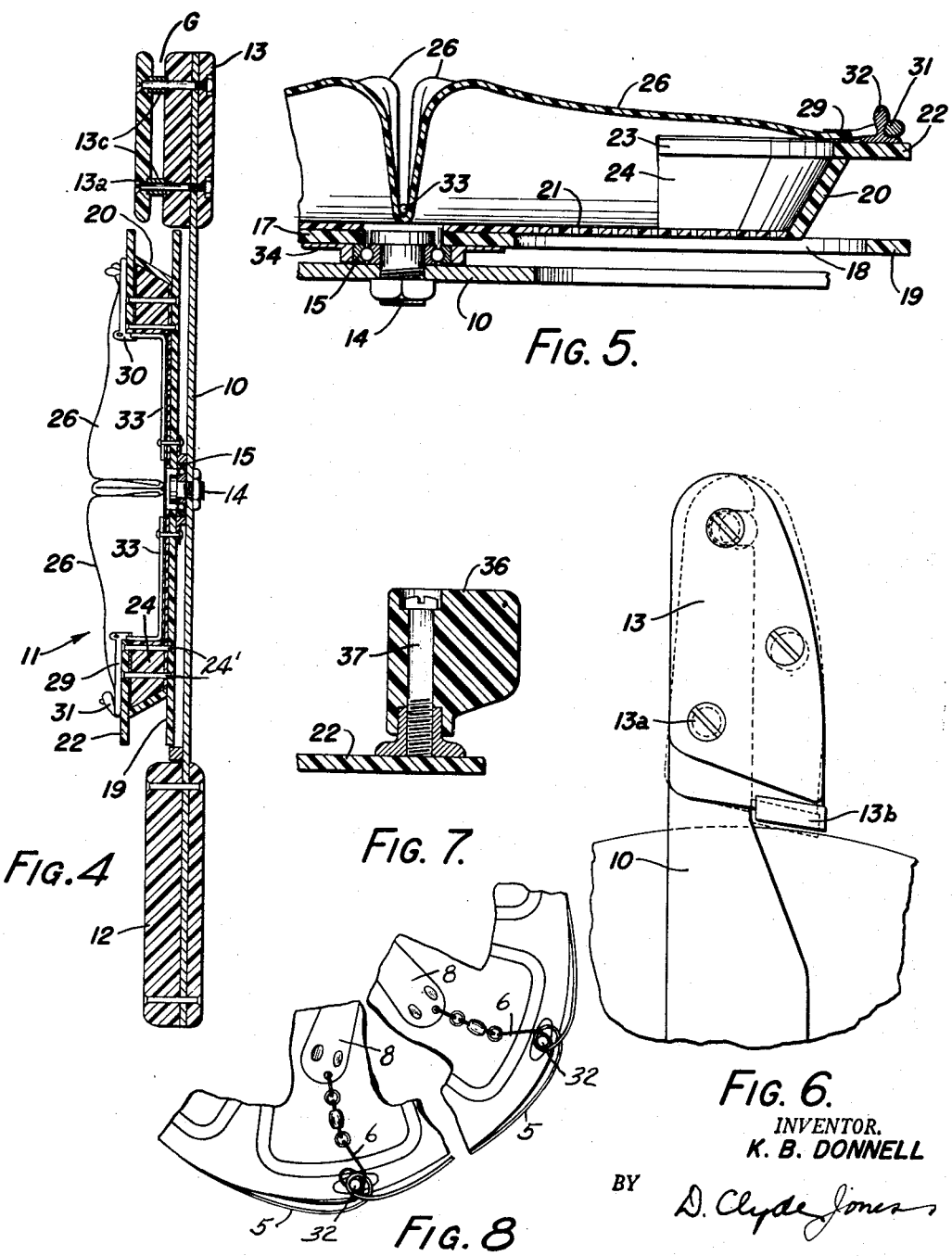
INVENTOR.
K. B. DONNELL
BY D. Clyde Jones
ATTORNEY Patented Aug. 4, 1953

2,647,339

UNITED STATES PATENT OFFICE 2,647,339

METHOD OF AND APPARATUS FOR MANIPULATING FISHLINES

Kenneth B. Donnell, Rochester, N. Y.

Application March 25, 1949, Serial No. 83,402

9 Claims. (Cl. 43—4.5)

This invention relates to a method of and to apparatus for manipulating a fish line.

Where a rig is used in fishing or where troll lines with multiple leaders and lures thereon are used, much difficulty has been encountered in the past as a result of the tangling of the main line and leaders and also as a result of snagging of the several hooks of the respective lures attached to the leaders. Such tangling of the main line and leaders as well as the snagging of the lures frequently occurs in the playing and landing of a fish.

One feature of the present invention relates to a novel method of paying out and reeling in a multiple leader fish line whereby the snagging of the lures as well as the tangling of the line and its leaders is in large part eliminated.

Another feature of this invention relates to a fishing reel whereby the present method can be practised and which obviates the need of any fishing rod and yet provides an easy way for the fisherman to manipulate his line both for paying out the line and for reeling in the line for eventual storage, all of which can be accomplished with minimum tangling of the line or snagging of the hooks.

The various features and advantages of the invention will appear from the detailed description and claims when taken with the drawings in which:

Fig. 1 illustrates a troll line with the several leaders thereon, in the respective positions assumed thereby while surface fishing from a moving boat;

Fig. 2 is a front view of a reel of the present invention showing especially the various pockets in which the individual lures are retained during storage, one of the pockets being shown in its open position;

Fig. 3 is a fragmentary rear view of the reel;

Fig. 4 is a longitudinal section through the reel taken substantially on the line 4—4 of Fig. 2 showing especially the mounting of the spool on the frame and also the construction of the several pockets provided at one side of the spool to store the individual lures;

Fig. 5 is a section taken substantially on the line 5—5 of Fig. 2 illustrating in enlarged form the construction of the pockets as well as the mounting of the spool for rotation on the support;

Fig. 6 is an enlarged detailed view of a combined handle and brake for the spool, which handle also serves to guide the line as it is payed out from the spool or as it is being wound up thereon;

Fig. 7 is an enlarged sectional view taken on the line 7—7 of Fig. 2 showing the mounting of one of the handles on the spool; and Fig. 8 is a detail view illustrating the snubbing of the main line.

While the reel of the present invention is useful in all types of fishing, it is particularly adapted for use with lines having multiple leaders with lures thereon. The present reel has been found especially suited for troll fishing from a moving boat B, in which, the outer end of the main line 5 which carries tippets or leaders 6, terminates in an edgewise and endwise traveling board 7 known as an otter. The otter is streamlined, weighted, balanced and set at an angle of draft so that it will generally follow a path parallel to that of the moving boat thereby maintaining the main line 5 almost at right angles to the direction of motion of the boat, as illustrated in Fig. 1. The main line is provided at desired distances along its length with the tippets or leaders 6 each of which terminates in a lure 8. These lures can all be of the same type or of different types as suits the fancy of the fisherman. In surface fishing the leader nearest the otter board is relatively short since frequently it will trail through shallow water, while the remaining leaders may be of any desired length. In deep fishing, the otter board is weighted so that it will travel at or near the bottom of the body of water, in which case the several leaders will extend outward from the main line at different levels.

In the manipulation of such a trawl line according to the present method, it is highly desirable to have a reel of such construction that the main line with its leaders can be readily handled and stored with a minimum danger of tangling. Also the reel should be so arranged that the present method of paying out the respective lures on long leaders in proper relation to the main line, can be conveniently practised.

In accordance with the present invention there is provided a reel which eliminates the need of a fishing rod. This reel comprises a flat bar 10 of light material such as aluminum, which is of a convenient length to be held comfortably with one end thereof resting against the body of the fisherman and with the other end thereof held in his left hand. This bar serves as a frame on which a spool 11 is rotatably supported on an intermediate part thereof. One end of the bar has pieces of plastic material or the like with rounded edges, attached to its respective surfaces, to form a grip 12. The other end of the bar carries a combined manipulating handle 13 with guides and rollers for the line as it is being let out from or being reeled onto the spool as well as a brake for the spool. This handle is mounted on the bar 10 for limited rocking movement about the bolt 13a from the position shown in full lines to the position shown in dotted lines in Fig. 6, so that a rubber block 13b carried by the handle can be moved into or out of engagement with a part of the spool to serve as a brake therefor. The handle is provided with a guiding channel G which directs the main line over rollers 13c to and from the spool. In use the grip 12 may be supported in a suitable bracket (not shown) mounted on a part of the boat. However, while the spool 11 is being rotated, the grip 12 is preferably pressed against the body of the fisherman while the manipulating handle 13 is supported in his left hand. This leaves the fisherman's right hand free so that he can rotate the spool 11 and can manipulate the lures.

In the preferred construction, the intermediate portion of the bar carries a stub shaft 14 in the form of a bolt on which there rotates a ball bearing 15 secured on one side of the spool at its center axis.

The spool 11 generally comprises a circular spider made from plastic sheet material or the like having a hub 17 with spokes 18 radiating therefrom to a rim 19. The hub has the ball bearing 15 secured on one surface thereof to rotate on the stub shaft 14. The spokes 18 at the surface thereof opposite the ball bearing, carry an annular support on which the line with its leaders can be wound. While this support can be molded integral with the spider, it is herein illustrated as comprising a narrow frustro-conical ring 20 fastened edgewise at its small end to the spokes just short of the rim 19 leaving spaces S through which the reeled-in line is exposed to the air to facilitate drying. A perforated disc 21 of a diameter such that it will just fit within the small end of the ring is fastened to the spider to provide a ventilated bottom for several lure pockets to be described, the perforations being designated 21'. At its larger end the ring 20, has secured thereto, a circular plate 22 of the same diameter as the spider. The center portion of this plate is cut away so that its inner margin is provided with projections 23, one of which is in registry with each spoke so that a block 24 of plastic material can be secured to a registering projection and spoke by means of rivets 24'. The mentioned projections on the plate give its inner edge a scalloped appearance, each scallop 23' serving to define in part an individual sector-shaped compartment or pocket 27a for each lure on each leader of the main line. A closure is provided for each pocket preferably in the form of a flexible, transparent sheet 26 of the approximate area of the spider and having a flap 27 for each pocket. The edge of each flap is reinforced by an arcuate metal frame 29 gripping this edge, the ends of the frame being hinged to metal ears 29' on supports 30 carried by adjacent blocks 24. The intermediate part of each frame carries a clasp 31 which engages a cooperating post 32 mounted on the adjacent surface of the plate 22 to latch the flap closed. Post 32 also serves to snub the main line and a leader thereon, as will be further set forth. In order that the several pockets may be separated from one another, an angular rod 33 extending from each block to the center of the spool presses a part of the flexible sheet 26 snugly against the disc 21. The ends of each rod can be anchored in various ways but as herein illustrated the inner end of a rod 33 is riveted through the disc 21 and the spider hub 17, to the rim 34 of the ball bearing. The outer or angular end of the rod can be fastened to an ear support 30. Plastic knobs 36 rotatable on the screws 37 which are mounted to project outward from the outer surface of the plate 22, serve as convenient means to unwind or to wind up the line on the spool.

In practising the method of this invention, let it be assumed that the main line 5 is to be reeled in. The fisherman takes the manipulating handle 13 in his left hand with the several pockets facing the right and presses the end of the grip 12 against his body. The main line is then placed in the guiding channel G so that it rests on the rollers 13c. Thereupon one of the knobs 36 is grasped in the fisherman's right hand so that the spool 11 can be rotated in a clockwise direction to wind the line thereon. As the main line is reeled in, it will be wound on the spool along with each leader in succession. At a point near a lure, the spool is stopped and the leader of this lure together with the parallel portion of the main line are given a turn around a post 32 to effect a snubbing action. It will be understood that the manipulating handle 13 can be rocked to bring the rubber block or brake 13b thereon, into engagement with the outer edge of the circular plate 22 so that the spool can be stopped and held stationary in any desired position. The lure on the mentioned leader is placed in one of the pockets and the flap closure thereof is snapped closed by the engagement of the clasp 31 with the mentioned post 32. The reeling in of the line is continued with the main line and each leader in succession, snubbed around a post 32 and the related lure is contained in one of the closed pockets. The otter board can then be disconnected from the end of the main line.

In paying out the main line with its leaders and lures, the same steps take place but in the reverse order, that is, the spool is rotated in a counter-clockwise direction. As the line is being payed out, a point will be reached where it is snubbed around a post 32, this will indicate to the fisherman, even in the dark, that a lure with its tippet or leader, is to be cast into the water. Then the unreeling of the main line is continued until all of the tippets with their respective lures are cast out.

Although the spool and the handles have been disclosed as being made from assembled parts, it will be appreciated that each of these elements can be made of die-castings or molded plastic material.

While a preferred form of the present device has been disclosed, it will be understood that many modifications thereof can be made, within the scope of the appended claims, without departing from the spirit of the present invention.

What I claim is:

1. A fishing reel comprising a support, a flattened spool rotatable on said support, said spool having a circumferential surface on which a line provided with at least one lure can be wound, and at least one pocket enclosed by the circumferential surface of said spool and accessible from one flattened side of the spool to receive said lure.

2. A fishing reel comprising a support, a flattened spool rotatable on said support, said spool having a circumferential surface on which a line provided with hooks can be wound, pockets on one side of said spool enclosed by the circumferential surface to receive said hooks and closing means for the respective pockets to retain said hooks therein.

3. A fishing reel comprising a support, a flattened spool rotatable on said support, said spool having a circumferential surface on which a line provided with lures can be wound, pockets enclosed by said surface and accessible from one side of said spool to receive said lures, and individual closures for the respective pockets to retain said lures therein.

4. A fishing reel comprising a support having a grip on one of its ends and a manipulating handle on its other end, a flattened spool rotatable on said support, said spool having a circumferential surface on which a line provided with lures can be wound, and pockets enclosed by said surface and accessible from one side of said spool to receive said lures, said handle being movable on said support and being provided with means to brake the rotation of said spool.

5. A fishing reel comprising a support, a flattened spool rotatable on said support, said spool having a circumferential surface on which there can be wound a line having a plurality of leaders each provided with a hook, said spool having a plurality of compartments enclosed by said surface, and a snubbing post on said spool adjacent each of a plurality of said pockets.

6. A fishing reel comprising a support, a flattened spool rotatable on said support, said spool having a circumferential surface on which there can be wound a line having a plurality of leaders each provided with a hook, said spool having a plurality of sector-shaped compartments enclosed by the circumferential surface and accessible from one flattened side of the spool to receive said hooks.

7. The method of manipulating a main fishing line having multiple leaders each provided with a hook, which comprises pulling in and winding the main line with the successive leaders into a common coil, and in the course of the winding of the coil, successively snubbing together each leader near the hook thereof and the adjacent part of the main line, at respective points at one side of the coil, and placing the hooks in separate stations within the coil.

8. The method of manipulating a main fishing line having multiple leaders each provided with a hook, which comprises pulling in and winding the main line with the successive leaders into a common coil, and in the course of the winding of the coil, maintaining together each leader near the hook thereof as well as the adjacent part of the main line at points outside of the coil, and placing the hooks in separate stations within the coil.

9. A method of fishing with a main line and a plurality of leader lines, secured at spaced intervals to the main line, which comprises first forming a portion of the main line into a coil, then forming a part of said portion of the main line and a leader secured thereto into a coil, then snubbing that leader and a section of that part of the main line, then positioning a lure secured to the leader in a station, and successively repeating the step with following portions of the line and leaders whereby each lure and a portion of its respective leader will be positioned in individual stations, and each leader and an adjacent portion of the main line will be individually snubbed into a coil formation.

KENNETH B. DONNELL.

References Cited in the file of this patent

UNITED STATES PATENTS

| Number | Name | Date |
|---|---|---|
| 285,630 | Kasschau | Sept. 25, 1883 |
| 468,227 | Pflueger | Feb. 2, 1892 |
| 515,899 | Breithaupt | Mar. 6, 1894 |
| 1,221,904 | Potier | Apr. 10, 1917 |
| 1,256,278 | Takeuchi | Feb. 12, 1918 |
| 1,359,668 | Buchenau | Nov. 23, 1920 |
| 1,397,790 | Tegner | Nov. 22, 1921 |
| 1,542,628 | Mason et al. | June 16, 1925 |
| 1,634,030 | Korkames | June 28, 1927 |
| 1,676,119 | Tipil | July 3, 1928 |
| 1,750,842 | Hren | Mar. 18, 1930 |
| 1,820,887 | Pflueger | Aug. 25, 1931 |
| 2,041,322 | Cantini | May 19, 1936 |
| 2,125,856 | De Witt | Aug. 2, 1938 |
| 2,190,984 | Gulbrandsen | Feb. 20, 1940 |
| 2,239,227 | Gunnufson | Apr. 22, 1941 |
| 2,333,632 | Benson | Nov. 9, 1943 |

FOREIGN PATENTS

| Number | Country | Date |
|---|---|---|
| 22,650 | Great Britain | 1906 |
| 57,415 | Sweden | Oct. 10, 1922 |
| 74,159 | Norway | Oct. 25, 1948 |